UNITED STATES PATENT OFFICE.

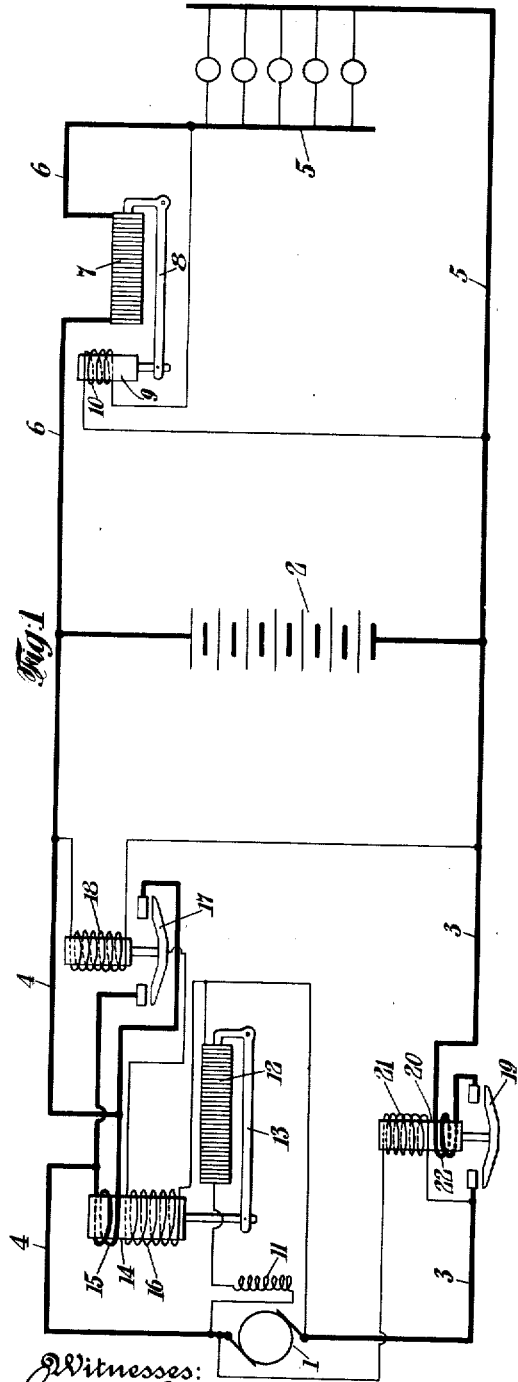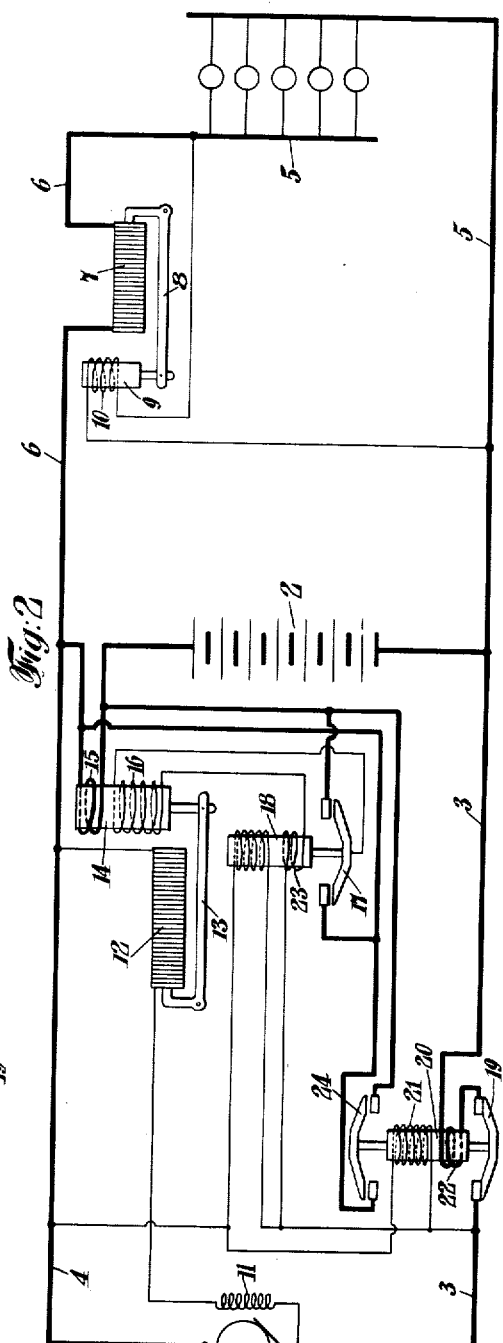

JOHN W. JEPSON, OF DEPEW, NEW YORK, ASSIGNOR TO GOULD COUPLER COMPANY, A CORPORATION OF NEW YORK.

ELECTRICAL SYSTEM OF DISTRIBUTION.

1,160,289.  Specification of Letters Patent.  Patented Nov. 16, 1915.

Application filed July 25, 1914. Serial No. 853,022.

*To all whom it may concern:*

Be it known that I, JOHN W. JEPSON, a citizen of the United States, and a resident of Depew, Erie county, New York, have invented certain new and useful Improvements in Electrical Systems of Distribution, of which the following is a specification.

My invention relates to improvements in electrical systems of distribution, and more particularly to systems in which a generator is driven at variable speed and adapted to charge a storage battery and supply a work or translation circuit. Such systems are more particularly useful in the lighting of railway cars, the generator being driven from the axle of the car, although the improvements will be found adaptable to other uses.

The main object of the invention is to provide a simple and efficient arrangement by which the generator may be regulated in such a manner as to charge the battery quickly and in a manner most suitable to the needs and long life of the battery, and, when the battery has become charged, to stop the charging thereof by means of an apparatus which is simple and efficient in construction and operation.

Further objects, features and advantages will more clearly appear from the detail description given below, taken in connection with the accompanying drawings, which form a part of this specification.

In the drawings, Figure 1 represents diagrammatically a system embodying my invention in one form; Fig. 2 is a diagram of a system embodying the invention in a modified form.

Referring to Fig. 1, 1 represents the main generator, which may be driven at variable speed, as from the axle of a railway car; 2 represents a storage battery adapted to be charged by the generator through the mains 3 and 4; 5 represents a work or translation circuit also adapted to be connected to be supplied by the generator through the mains 5 and 6.

In order that the voltage on the lamps or translation circuit 5 may remain constant irrespective of voltage changes across the battery, a lamp regulator, comprising a carbon pile 7, is placed in series in the main 6 and controlled by a lever 8 operated by a solenoid 9 controlled by a current coil 10 connected across the lamp circuit 5, in order to be responsive to the voltage changes thereof. Any increase in voltage on the work circuit causes the solenoid 9 to raise lever 8 and increase the resistance of the pile 7, and the tendency of the voltage on the work circuit to decrease causes a reverse operation, so that the voltage on the work circuit 5 is maintained substantially constant.

11 represents the shunt field windings of the generator 1, and, placed in series with these windings, is a carbon pile regulator 12 operated upon by a lever 13 actuated by a solenoid 14 having two controlling coils, one coil 15 being connected serially between the generator and battery 2 in the main circuit 4, so that it carries both battery and lamp current, and the other coil 16 being a voltage coil adapted to be connected across the generator to be responsive to generator voltage changes.

17 represents a switch adapted to short circuit the coil 15 when closed. The switch 17 is operated by a solenoid 18, the windings of which are connected across the battery, to be responsive to battery voltage changes or increases in the voltage of the battery. Any other arrangement of windings of the solenoid 18 may be used, as long as the same is made responsive to increases in voltage of the battery, or so that it will operate when the battery has become substantially charged. One terminal of the coil 16 is connected to one side of the generator 1, while the other terminal is connected to the movable switch member 17. Thus, when the switch 17 is open, coil 16 is open-circuited, and when the switch 17 is closed, coil 16 is connected across the generator to be responsive to generator voltage changes.

Connected in the main 3 is a main switch 19, operated by a solenoid 20, having two controlling coils 21 and 22. Coil 21 is a voltage coil connected across the generator to be responsive to generator voltage changes, while the coil 22 is connected in series with main 3.

Assuming that the system is being started up and that the speed of the generator is increasing from low to high speed:—When the generator voltage becomes equal to the battery voltage (the battery being adapted to supply the lamp circuit when the generator is not running or is running at too low a speed), or sufficient to furnish current to the lamp circuit, the coil 21 is sufficiently energized to close the switch 19, thereby connecting the generator with the battery and lamp circuit. The closing of switch 19 causes coil 22 to be energized, which acts to aid coil 21 to maintain the switch closed. When the voltage of the generator has risen to such a value, due to increase in speed thereof, that the desired maximum charging current is furnished to the battery, then any tendency to further increase the charging current of the battery causes the current coil 15 to operate the solenoid 14, raise the lever 13, increase the resistance of the pile 12 to decrease the current in the fields 11, and thus tend to decrease the voltage of the generator, so that during further increases in speed, the current passing through the coil 15 or the main circuit 3, 4, is maintained substantially constant, irrespective of changes in speed.

The action above described may be said to continue until the battery has become substantially charged. When this has occurred, the voltage across the battery will be such that the coil 18 will be sufficiently energized to close the switch 17. This shunts and renders the current coil 15 ineffective on the solenoid and ineffective in the regulation of the generator, but, at the same time, renders coil 16 effective in the regulation of the generator, coil 16 having been heretofore ineffective by reason of its being open-circuited at the switch 17.

After the closing of the switch 17, the carbon pile rheostat 12 will be controlled purely by the voltage coil 16, while it had, before the closing of the switch 17, been controlled purely by the current coil 15. Consequently, after the voltage coil 16 assumes control, the generator will be regulated solely by voltage changes across the generator, so that the generator voltage will thereafter be maintained constant throughout changes in speed, should the speed of the generator tend to increase above the desired value. By proper adjustment and design of the switch 17, solenoid 18 and coil 16, the voltage at which the generator is maintained constant by the coil 16 may be less that that at which the switch 17 closes, so that the voltage maintained after the battery has become charged may be somewhat less than that at which the final charging of the battery takes place.

From the above, it will be seen that two independent controls of the generator are provided, one a purely current control, and the other a purely voltage control, these controls being shifted from one to the other as desired, preferably when the battery has become substantially charged; and, although two controls are provided and switching means for changing from one to the other, yet only one carbon pile is necessary, as far as the regulation of the generator is concerned, and only one lever and solenoid operating said pile.

Referring to the modification shown in Fig. 2, the system there shown is substantially the same and operates in substantially the same manner as that shown and described in connection with Fig. 1, with the exception that the current coil 15, instead of being connected in the main 4, is serially connected between the generator and battery by being in series in the battery branch. It, therefore, does not carry any of the lamp current when the generator is supplying current to the battery and lamps. Also, in order that the voltage at which the generator is maintained constant after the battery has become charged may be very materially decreased from the value of voltage at which the final charging of the generator took place, an auxiliary coil 23 is provided on the solenoid 18, which acts to aid the other voltage windings on said solenoid. The coil 23 is placed in series with the winding 16, so that the windings 23 are only energized when the switch 17 is closed. Thus, when the switch 17 is closed, its solenoid 18 will enable it to be and remain tightly closed by the additional energization of windings 23, even although the generator voltage be materially decreased below the value necessary to initially close the switch 17. Also, in this modification, a switch 24 is shown, connected to the upper end of the switch 19, which switch 24 is adapted to short-circuit the current coil 15 when the main switch 19 is open and the battery is supplying the lamps, in order to prevent the battery current flowing to the lamps from going through the coil 15 and thus possibly actuating the solenoid 14 in such a manner as to so increase the resistance of pile 12 as to hinder the building up of the generator when its speed is again increased.

Although I have described my improvements in great detail and with respect to certain specific embodiments of the invention, nevertheless I do not desire to be limited to the details shown and described, except as clearly pointed out in the appended claims, since many changes and modifications may well be made without departing from the spirit and scope of my invention in its broader aspects.

Having fully and clearly described my improvements, what I claim as new and desire to secure by Letters Patent is:—

1. An electrical system of distribution having, in combination, a generator driven at variable speed, a storage battery connected to be charged thereby, a lamp circuit in operative relation thereto, means for regulating the voltage of the generator, said means embracing a current coil in series between the battery and lamps and a voltage coil responsive to voltage changes of the generator, and means responsive to increases in voltage across the battery for rendering said current coil ineffective and said voltage coil effective in the regulation of the generator voltage when the battery has reached a predetermined state of charge, a main switch for automatically connecting and disconnecting the generator from the battery, and means for automatically rendering said current coil ineffective when said main switch disconnects the generator from the battery.

2. An electrical system of distribution having, in combination, a generator, a storage battery connected to be charged thereby, a carbon pile regulating the field strength of the generator, a current coil serially connected in the battery circuit, a voltage coil responsive to voltage changes of the generator, means co-acting with said coils for varying the pressure on said carbon pile, and a switch device responsive to voltage changes across the battery for simultaneously rendering said current coil ineffective on said means and said voltage coil effective on said means, a main switch for automatically connecting and disconnecting the generator from the battery, and means for automatically rendering said current coil ineffective when said main switch disconnects the generator from the battery.

3. An electrical system of distribution having, in combination, a generator, a storage battery connected to be charged thereby, means for regulating the generator voltage comprising a coil serially connected between the generator and battery for maintaining constant current in said coil, and a voltage coil responsive to generator voltage variations for maintaining the generator voltage substantially constant, and means actuated according to the voltage of the battery for rendering the current coil ineffective and the voltage coil effective in regulating the generator voltage, said last-mentioned means being actuated at a greater voltage than that at which said voltage coil maintains the voltage of the generator.

4. An electrical system of distribution having, in combination, a main shunt-wound generator driven at variable speed, a carbon pile in series with the shunt field of the generator for regulating the generator voltage, a storage battery and work circuit operatively connected to the generator, a solenoid having thereon a controlling current coil serially connected between the generator and battery and a voltage coil responsive to battery voltage changes to maintain the voltage of the generator substantially constant, a lever for varying the pressure on said pile controlled by said solenoid, and a voltage-controlled switch for simultaneously rendering said voltage coil effective and rendering said current coil ineffective on said carbon pile when the battery has become substantially charged, said switch being actuated at a greater voltage than that at which said voltage coil maintains the voltage of the generator.

5. An electrical system of distribution having, in combination, a generator, a storage battery connected to be charged thereby, means for regulating the generator voltage comprising a coil serially connected between the generator and battery for maintaining constant current in said coil, and a voltage coil responsive to generator voltage variations for maintaining the generator voltage substantially constant, and means actuated according to the voltage of the battery when the battery has become substantially charged for rendering the current coil ineffectve and the voltage coil effective in regulating the generator voltage, said last-mentioned means being actuated at a greater voltage than that at which said voltage coil maintains the voltage of the generator to maintain the generator voltage at a value less than that required in the final charging of the battery.

In testimony whereof, I have signed my name to this specification, in the presence of two subscribing witnesses.

JOHN W. JEPSON.

Witnesses:
  P. W. ENGLISH,
  JOS. MURPHY.

Correction in Letters Patent No. 1,160,289.

It is hereby certified that in Letters Patent No. 1,160,289, granted November 16, 1915, upon the application of John W. Jepson, of Depew, New York, for an improvement in "Electrical Systems of Distribution," an error appears in the printed specification requiring correction as follows: Page 2, line 86, for the word "plate" read *place;* and that the said Letters Patent should be read with this correction therein that the same may conform to the record of the case in the Patent Office.

Signed and sealed this 11th day of January, A. D., 1916.

[SEAL.]

Cl. 171—313.

J. T. NEWTON,
*Acting Commissioner of Patents.*